US012597314B2

(12) United States Patent
Andrassy et al.

(10) Patent No.: US 12,597,314 B2
(45) Date of Patent: Apr. 7, 2026

(54) METHOD FOR A GAMING SYSTEM

(71) Applicant: Play'n Go Marks Ltd, Valletta (MT)

(72) Inventors: Gabor Andrassy, Valletta (MT); Charlotte Miliziano, Valletta (MT)

(73) Assignee: PLAY'N GO MARKS LTD, Valletta (MT)

( * ) Notice: Subject to any disclaimer, the term of this patent is extended or adjusted under 35 U.S.C. 154(b) by 231 days.

(21) Appl. No.: 18/595,829

(22) Filed: Mar. 5, 2024

(65) Prior Publication Data

US 2024/0304058 A1 Sep. 12, 2024

(30) Foreign Application Priority Data

Mar. 6, 2023 (SE) .................................... 2350249-5

(51) Int. Cl.
*G07F 17/34* (2006.01)
*G07F 17/32* (2006.01)

(52) U.S. Cl.
CPC ...... *G07F 17/3225* (2013.01); *G07F 17/3213* (2013.01); *G07F 17/3267* (2013.01); *G07F 17/34* (2013.01)

(58) Field of Classification Search
CPC ............. G07F 17/3225; G07F 17/3213; G07F 17/3267; G07F 17/34; G07F 17/3211; G07F 17/3262
See application file for complete search history.

(56) References Cited

U.S. PATENT DOCUMENTS

| | | | | |
|---|---|---|---|---|
| 9,373,226 | B1 | 6/2016 | Henrick et al. | |
| 2005/0101387 | A1 | 5/2005 | Wolf | |
| 2011/0117989 | A1 * | 5/2011 | Kennedy | G07F 17/34 463/20 |
| 2013/0084963 | A1 * | 4/2013 | Shorrock | G07F 17/3239 463/43 |
| 2014/0329591 | A1 | 11/2014 | Caputo et al. | |
| 2017/0301178 | A1 | 10/2017 | Thomas et al. | |
| 2019/0099672 | A1 | 4/2019 | Oyama et al. | |
| 2020/0250923 | A1 * | 8/2020 | Ceniceroz | G09G 3/20 |
| 2021/0110635 | A1 | 4/2021 | Yost et al. | |
| 2021/0142622 | A1 * | 5/2021 | Sanborn | G07F 17/34 |

OTHER PUBLICATIONS

Swedish Search Report dated Oct. 10, 2023 for Swedish Patent Application No. 2350249-5, 2 pages.

Extended European Search Report dated Jun. 20, 2024 for EP Application No. 24161173.0, 7 pages.

* cited by examiner

*Primary Examiner* — Pegeman Karimi
(74) *Attorney, Agent, or Firm* — RMCK Law Group, PLC

(57) ABSTRACT

The present disclosure relates to a computer implemented method performed by a gaming system. In particular, the present disclosure relates to a scheme for further improving a randomness in a game provided by means of the gaming system. The present disclosure also relates to a corresponding gaming system and a computer program product.

17 Claims, 4 Drawing Sheets

METHOD FOR A GAMING SYSTEM

CROSS-REFERENCE TO RELATED APPLICATIONS

This application claims priority to Swedish Patent Application No. 2350249-5, filed on Mar. 6, 2023. The disclosure of the above application is hereby incorporated by reference in its entirety.

TECHNICAL FIELD

The present disclosure relates to a computer implemented method performed by a gaming system. In particular, the present disclosure relates to a scheme for further improving a randomness in a game provided by means of the gaming system. The present disclosure also relates to a corresponding gaming system and to a computer program product.

BACKGROUND

Games of chance are known and widely played for recreational purposes. The gaming industry has come to recognize that to sustain long term success it must be constantly innovative in introducing new games and new gaming concepts to the gaming public. One example of this innovating drive can be appreciated in the embrace of the Internet and online gaming by the gaming industry.

A common trend within the online gaming industry is to provide potentially new and current players with new means for attracting and ensuring that players remain at the online site, controlled by a gaming operator, providing the games. An example of such a means is the introduction of further unexpected scenarios in the game, potentially allowing a player to be further driven to play the game since the player has a desire to participate with the game in case of such an unexpected scenario appearing.

The introduction of possible unexpected scenarios in the game could also further increase the payout to the player, since the unexpected scenario possibly could add a further leverage to a bet placed by the player. Although this of course is of high interest to the player, such further possible payouts must be closely controlled by a gaming operator, ensuring that the payouts stay within desired boundaries. Thus, there is a general need to balance the attraction power of the game by means of possible further and higher payouts, while at the same time ensuring that an operator is in total control of the game.

SUMMARY

According to an aspect of the present disclosure, the above is at least partly met by a computer implemented method performed by a gaming system, the gaming system comprising a server arranged in communication with an electronic user device using a network connection, the electronic user device comprising a display screen, wherein the method comprises the steps of receiving, at the server, a request from the electronic user device to play a game provided by the server, the game including a plurality of different levels, forming, at the server, a table in the form of a grid having a selected dimension and comprising a selected number of cells, generating, at the server, a set of elements corresponding to the selected number of cells, wherein the set of elements are selected from a group of predefined element types, and the selection of the set of elements is dependent on a present level of the plurality of different levels, populating, at the server, the cells of the table with the set of elements, directing, using the server, the electronic user device to display the table at the display screen, providing, using the server, a set of game visuals to the electronic user device to enable a player to interact with the game, receiving, at the server, a player interaction from the electronic user device as a response to the set of game visuals, determining, at the server, a gaming outcome by applying a matching scheme adapted to match a cluster of adjacently arranged cells within the table with one of a plurality of predefined cluster formations stored at the server, wherein the matching scheme applied for determining the gaming outcome is dependent on the present level, and selecting, at the server, another level of the of the plurality of different levels based on the gaming outcome and the received player interaction.

Generally, when the operational scheme according to the present disclosure is applied to a game concept provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes. This could potentially be beneficial to both the player participating in the game and the gaming operator providing the game.

Additionally, allowing for an increased randomization of the game may potentially further increase the security of the game, since known general computer-based issues relating to the generation of randomized material to the game are minimized. It should be noted, to enhance the technical framework of the gaming system, especially in terms of security, it may be desirable and in line with the present disclosure to adapt the gaming system to employ a randomization mechanism that is rooted in cryptographic principles. Such a mechanism may for example utilize cryptographic hash functions to generate unpredictable, non-repeating patterns for game element selection and level progression, thereby ensuring that each gaming session is unique and cannot be externally predicted or manipulated. The application of such cryptographic techniques addresses critical security concerns, including the prevention of pattern recognition and replay attacks, which are prevalent in online gaming environments. By integrating these advanced randomization methods, the system not only enhances the unpredictability and fairness of the game but also significantly fortifies its defense against both passive and active security threats.

Furthermore, it is preferred to arrange the gaming system to continuously monitor and adapt the randomization parameters in real-time, based on ongoing threat analysis and the detection of attempted security breaches. Such an adaptive security arrangement allows for the dynamic adjustment of randomization algorithms in response to evolving threats, ensuring that the system's integrity is maintained under various attack scenarios.

In accordance with the present disclosure, at least a portion of the gaming concept where the player is interacting involves engaging with a table comprising a plurality of cells, where the cells are arranged in lines and columns and where each of the cells is populated with an element. Such elements may for example include different types of elements, for example including numbers and/or symbols of any kind and matching a desired implementation of the game to be played by the player. In one embodiment the game is defined as a virtual slot game, i.e. a game operated at a screen rather than using physically movable elements.

Furthermore, according to the present disclosure the game is segmented into a plurality of different levels, where a player operating his electronic user device will be allowed to step though, e.g. progressively, each of the levels one by one, where each level will have different complexity and allow for different types of gaming outcomes. In some embodiments, it is possible to arrange the game such that the player may jump as well as down from one level to another level. Accordingly, in some embodiments the player is not restricted to just travel through the levels in a strict order. In a preferable embodiment of the present disclosure, a player is not restricted to travel up or down from one level to the next but will not be able to travel up a level until that level is unlocked. Rather, the player may be allowed to return back to a previous level if that would be desirable for the player. The introduction of the different levels may allow the player to get introduced to a specific type of game, firstly at an in comparison lower level with, in comparison, less complexity, to then move along to more complex and potentially more strategically challenging tasks.

With increasing levels generally comes higher stakes and possibly gaming outcomes having more impact for the player. To ensure that the game is operated with the outmost safety and security, the inventors have identified that it is necessary to ensure that the randomness of the game can be increase as gaming outcomes with more player impact is introduces. At the same time, it is necessary to ensure that the computational resources of the server operating the game is distributed as relevant as possible. The present disclosure therefore implements a matching scheme for determining the gaming outcome that is dependent on the present level. The matching scheme is in turn used by the server to match a cluster of adjacently arranged cells within the table with one of a plurality of predefined cluster formations stored at the server.

Consequently, rather than using exactly the same matching scheme throughout the game and for all of the different levels, the present disclosure adapts the matching scheme dependent on the present level and may as such direct more of the computational resources of the server for the in comparison "higher levels" as compared to the "lower levels".

Furthermore, it will by means of the present disclosure be possible to implement complex element types which improves the randomization of the game (as compared to prior-art solutions), while still ensuring that the computational burden at the server is limited and reduced (as compared to what would be needed in case of applying prior-art randomization techniques commonly used in relation to online gaming).

Additionally, since less players generally are expected to play at the higher levels as compared to the lower levels, overall less computational resources will be needed for operating the games when a plurality of players simultaneously requests to enter into a gaming session. Using in comparison less computational resources will additionally have a positive impact on energy consumed by the server, a general desire for an operator of the server.

In some embodiments it may be possible to use a combination of load monitoring and predictive analytics, whereby the server dynamically scales its computational power. During peak times when multiple players are engaging with lower levels, the system allocates more resources to ensure seamless gameplay without lag or delay. Conversely, for higher levels, where player density decreases, the system conservatively reduces resource allocation, thereby lowering the operational load on the server. Such an approach not only ensures optimal game performance across all levels but also significantly reduces unnecessary computational expenditure.

Furthermore, the operational scheme according to the present disclosure uniquely capitalizes on server-side computational resources to handle both data processing and bandwidth optimization. By streamlining the server algorithms, the system not only reduces computational overhead but also improves the use of network bandwidth. The processed game data is then efficiently transmitted to the electronic user device, ensuring a fluid and seamless gaming experience. This amalgamation of computational efficiency and bandwidth optimization serves a dual purpose, it expedites the gaming process for players while also conserving valuable server resources. Consequently, the system can accommodate a greater number of players without compromising on performance, potentially enhancing both the user experience and the game operator's revenue streams.

For ensuring that the determination of the gaming outcome is performed with a minimum amount of perceived delay in the progression of the game it is desirable to apply a computational efficient matching scheme. Possible schemes that can be used in relation to the present disclosure include different forms of so-called graph-based image processing methods that today find usage within e.g. the computer vision field, such as finding paths in images. It should be understood that the matching scheme may be differently configured for each level to achieve the desired effects of varying amounts of computational resources for the different levels. Accordingly, the overall matching scheme may be the same for each level, but specifically targeted for each of the different levels.

The gaming system according to the present disclosure is preferably and at least in some embodiments arranged to dynamically adjust to the complexity of the game and based on player progression through different levels, e.g. implemented to accommodate each level's unique requirements. Possibly, the selection and arrangement of game elements within the grid may preferably be controlled by such algorithms, facilitating a progressive increase in game difficulty and diversity. Such a strategic application of the algorithms ensures that the gaming system's capability to process a multitude of potential outcomes efficiently, thereby preserving system responsiveness as the game advances in complexity.

Incorporated within the system is also preferably a mechanism for level-dependent selection of elements, advantageously adapted based on an analysis of player interactions and historical gaming outcomes. Such a mechanism may for example utilize predictive modeling to tune the selection process, ensuring the introduction of elements at each level aligns with optimal player engagement and challenge. Such real-time adjustment of the model ensures that the variety and complexity of elements introduced remain engaging, significantly enhancing player experience over traditional gaming systems where element variety and progression may be static.

Furthermore, the deployment of the matching scheme is preferably focused on optimizations aimed at computational resource management. Through the use of advanced data structures and caching techniques, it may be possible to effectively reduces the computational load required for evaluating and implementing the matching scheme across the different levels. Such a strategic allocation of computational resources ensures that server processing is efficiently utilized, focusing on real-time updates to the game state and player actions. Such an approach ensures that the gaming system can scale computational resources dynamically, maintaining consistent performance across diverse hardware configurations.

In relation to the discussion above, the definition of "adjacently" as used above may be dependent on the specific implementation of the present scheme. For example, adjacently may be defined as arranged on the same row of the table or in the same column of the table. It may however also be possible to allow other cluster formations to be seen as adjacently, such for example comprising a combination of cells arranged both on different columns and on different rows, but at least sharing a side of a cell to another cell holding a matching element. Other definitions of clusters comprising matching elements are of course possible and within the scope of the present disclosure. Such a further example of a cluster may be where matching elements form specific "shapes", but not necessarily share a cell side with each other. Thus, two adjacent cells may possibly, in some embodiments, be seen as two cells at least having "touching" cell corners.

Generally, the cells of the table include four sides, formed as rectangles. However, the cells of the table may have any number of sides from three and upwards. Accordingly, the cells may be shaped as triangles, rectangles/squares, octagons, etc. It could also be possible to combine differently shaped cells in the same table.

As indicated above, the table is populated with a different element, where the elements are selected from a group of predefined element types. The group of predefined element types may in some embodiments comprise the generic element types that are common to slot games, etc., for example including "bar" symbols or elements from a deck of cards. Other element types, possibly specific for the game, are of course possible and within the scope of the present disclosure. The type of elements may also include at least one generic element type, in some embodiments defined as a wild card or a joker element, that may be matchable to all of the plurality of predefined element types. As such, the generic element type may be equally matchable with e.g. a number as well as a symbol.

In accordance to the present disclosure, it may in some embodiments be desirable to allow each level to include a set combination of gaming features, where the set combination of gaming features are differing for each level. Such features may for example include different types of game operations, such as the introduction of so called "wilds", re-spins, free spins, scatter symbols (scatter symbols are special symbols in online slots that have specific functions according to the game you're playing. In some slots, they might trigger different types of bonus features). multipliers, bonus games, sticky wilds (were the wild will stay stationary on the grid for a predetermined time, until a trigger is reached or a scatter symbol appearing) etc. or a combination thereof. Specific examples of the game feature combinations include two wilds that trigger a single re-spin while they remain stationary on the grid for a predetermined time or until a trigger is reached (sticky), triggering a re-spin with a new wild landing, which also becomes sticky, bonus scatter(s) that land on a specified reel(s) and award a multiplier(s) for a bet payout and/or causes the wild symbols to become sticky. It should be understood that the features added when "levelling up" generally are removed in case of "levelling down" or stepping down from a higher to a lower level. The game features can also be upgraded or downgraded through the levels e.g. the removal of the scatter symbols so that a re-spin or a bonus round cannot be triggered. Preferably the introduction and removal of the game features makes each level of the game progressively volatile.

Preferably, the selection of another level advantageously further based on a progression goal being attained. As an example, each level may have a predefined "game objective" that is to be achieved by the player when attending a specific level. Once the game objective has been achieved, the player may be allowed to move on to an in comparison higher level. Examples include obtaining at least three wins with a wild symbol, triggering of bonuses, re-spins, free spins or a combination thereof. By means of such an implementation it is possible to ensure that the players are well prepared for the next level before being allowed to attend the higher/next level. From a technical perspective it is by means of such an embodiment possible to ensure that only some of the players are moving to the higher levels where additional computational resources are needed. The operator of the server may as such balance available resources with the number of players presently requesting to enter into the game.

As an alternative, or also, it may be possible to allow the gaming features to include a combination of changing of dimensions of the table and selected number of cells, element types, chances of a successful game outcome, winning combinations, gaming features and/or the progression goal. In a similar manner as discussed above, the operator of the server may possibly balance available resources with the number of players presently requesting to enter into the game.

Furthermore, in a preferred embodiment the combination of game features in different levels includes at least one of an increase in the group of predefined element types and an increase in the selected dimension of the table and the selected number of cells. As an example, the table may be allowed to increase in size, including the number of cells in the table, thereby increasing the complexity of the game. As discussed above, levelling down may in a similar manner e.g. reduce the size of the table.

In some embodiments of the present disclosure the first game is a game of chance, such as for example a slot game, where the player is placing a bet to be allowed to participate in the game. The gaming outcome may in such an embodiment be dependent on the bet placed by the player.

As indicated above, the server is in charge of controlling the electronic user device to display the table as well as the gaming outcome at the display screen of the electronic user device. In some embodiments the electronic user device is adapted to present a graphical user interface (GUI) at the display screen. The server may in a corresponding manner be adapted to a graphical representation of at least one of the tables, the gaming outcome and the updated table, to be distributed to the electronic user device, where the graphical representation is then presented within the GUI.

Such a GUI may also be arranged to allow the player to directly interact with the server, for example allowing the player to control his/her participation in the game as well as to control a size of the bet placed when participating in the game.

Within the context of the present disclosure the expression "forming a graphical representation" should be interpreted broadly. Specifically, it should be understood that the server in some embodiment may be configured to only form a collection of "meta-data" (here corresponding to the graphical representation) that will be rendered at the frontend, such as within the GUI of the electronic user device. However, in another embodiment it may be the other way around, meaning that the server will essentially form an image (here corresponding to the graphical representation) that then will be displayed within the GUI of the electronic user device. Further alternative implementations along the same mutations are possible and within the scope of the present disclosure. Additionally, it may also be possible to allow the graphical representation to be set differently for different game operators, players or groups of players. The graphical representation may also be dependent on e.g. the geographical location of the players, such as dependent on city, country or continent where the player is located/registered.

Within the context of the present disclosure, it should be understood that it in some embodiments so that it may be possible to allow the server to control if a specific electronic user device is to be allowed to apply the scheme according to the present disclosure. Such control may for example be dependent on a geographical location of the electronic user device. Possibly, the geographical location may be selected from a group comprising a city, a country and a continent.

In a possible embodiment of the present disclosure the method further comprises the steps of updating, at the server, the graphical representation of the table to highlight the continuous path, and distributing, from the server to the electronic user device, the updated graphical representation. Accordingly, once the server has determined that there is a continuous path present, it will update the graphical representation that is to be presented to the player. The graphical representation may in this situation possibly include an indication of the gaming outcome.

According to another aspect of the present disclosure there is provided a gaming system comprising a server arranged in communication with an electronic user device using a network connection, the electronic user device comprising a display screen, wherein the server is adapted to receive a request from the electronic user device to play a game provided by the server, the game including a plurality of different levels, forming, at the server, a table in the form of a grid having a selected dimension and comprising a selected number of cells, generate a set of elements corresponding to the selected number of cells, wherein the set of elements are selected from a group of predefined element types, and the selection of the set of elements is dependent on a present level of the plurality of different levels, populate the cells of the table with the set of elements, direct the electronic user device to display the table at the display screen, provide a set of game visuals to the electronic user device to enable a player to interact with the game, receive a player interaction from the electronic user device as a response to the set of game visuals, determine a gaming outcome by applying a matching scheme adapted to match a cluster of adjacently arranged cells within the table with one of a plurality of predefined cluster formations stored at the server, wherein the matching scheme applied for determining the gaming outcome is dependent on the present level, and select another level of the of the plurality of different levels based on the gaming outcome and the received player interaction.

This aspect of the present disclosure provides similar advantages and embodiments as discussed above in relation to the previous aspects of the present disclosure.

Preferably, the gaming system is a cloud-based computing system, and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server arranged in communication with an electronic user device using a network connection, the electronic user device comprising a display screen, wherein the computer program product comprises code for receiving, at the server, a request from the electronic user device to play a game provided by the server, the game including a plurality of different levels, code for forming, at the server, a table in the form of a grid having a selected dimension and comprising a selected number of cells, code for generating, at the server, a set of elements corresponding to the selected number of cells, wherein the set of elements are selected from a group of predefined element types, and the selection of the set of elements is dependent on a present level of the plurality of different levels, code for populating, at the server, the cells of the table with the set of elements, code for directing, using the server, the electronic user device to display the table at the display screen, code for providing, using the server, a set of game visuals to the electronic user device to enable a player to interact with the game, code for receiving, at the server, a player interaction from the electronic user device as a response to the set of game visuals, code for determining, at the server, a gaming outcome by applying a matching scheme adapted to match a cluster of adjacently arranged cells within the table with one of a plurality of predefined cluster formations stored at the server, wherein the matching scheme applied for determining the gaming outcome is dependent on the present level, and code for selecting, at the server, another level of the of the plurality of different levels based on the gaming outcome and the received player interaction. Also this aspect of the present disclosure provides similar advantages and embodiments as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
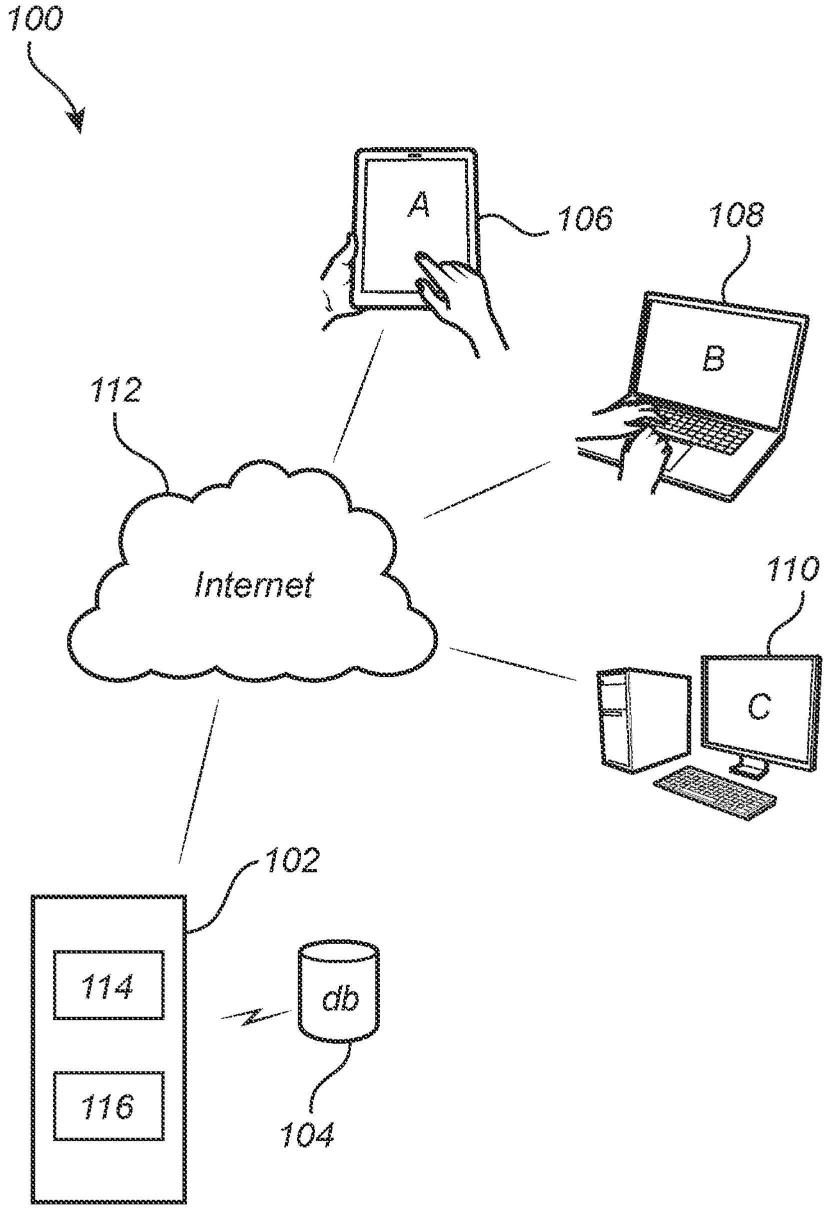
FIG. 1 illustrates an exemplary gaming system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness to fully convey the scope of the present disclosure to the skilled addressee. Like reference characters refer to like elements throughout.

Referring now to the drawings and FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of electronic user devices in the form of electronic user devices, such as client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further electronic user device 114 may be fixed systems, mobile systems, portable systems, or cloud systems (as discussed above). FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
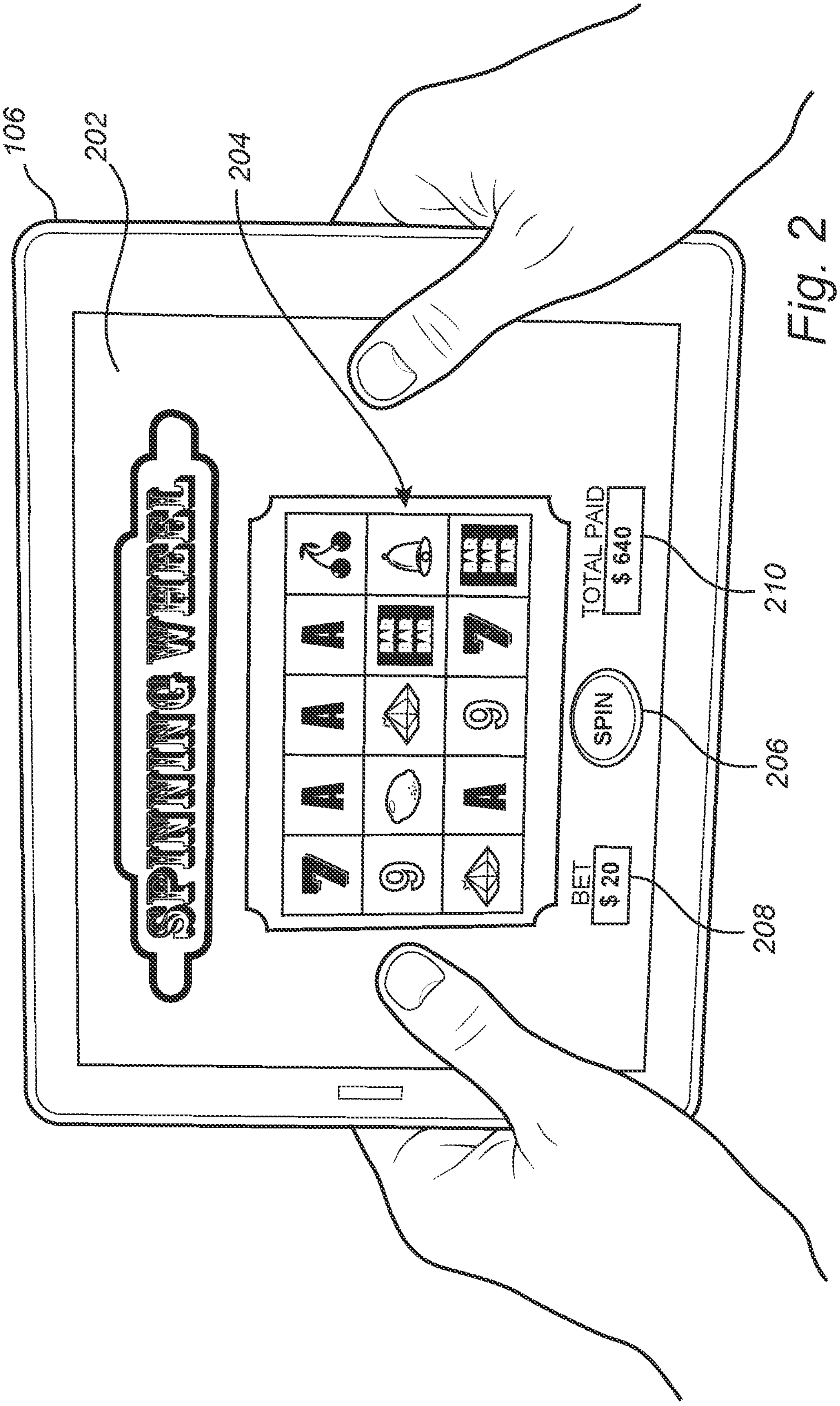
FIG. 2 provides an exemplary illustration of a typical graphical user interface (GUI) for use in playing a game.

Turning now to FIG. 2 illustrating a graphical user interface (GUI) 202 to be displayed at a client device, such as any of the client devices 106, 108, 110, in the illustrated embodiment provided as an application ("app") or within e.g. a web browser of the portable client device 106 being a tablet. The game to be played at the client device 106 is here shown as an online game of chance in the form of a slot game, visualized within the GUI 202 as comprising a table comprising five individual reels 204 arranged in columns and provided with a plurality of different symbols. The table also comprises three rows. As such, the predefined dimension of the table as shown in FIG. 2 is five times three, thus comprising 15 cells in total.

The GUI also comprises a "button" 206 to start the game, here provided with the description "SPIN" for initiating a turn of the game. In addition, the GUI 202 comprises an indicator of the current bet 208 (i.e. payment for each turn of the game) and an indicator of the total payment to the player 210. It should in any case be understood that other types of games may be played within the scope of the present disclosure, for example being skill based as compared to a game of chance.

Figure 3A:
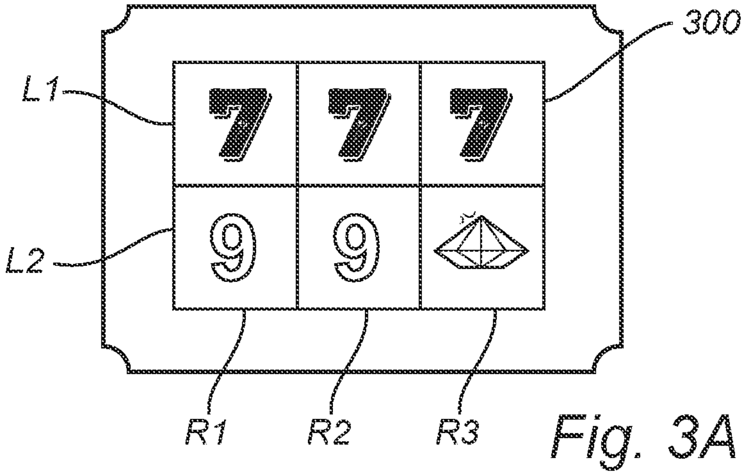
FIGS. 3A-3C present exemplary illustrations of operations of different tables according to different embodiments of the present disclosure.
Figure 3B:
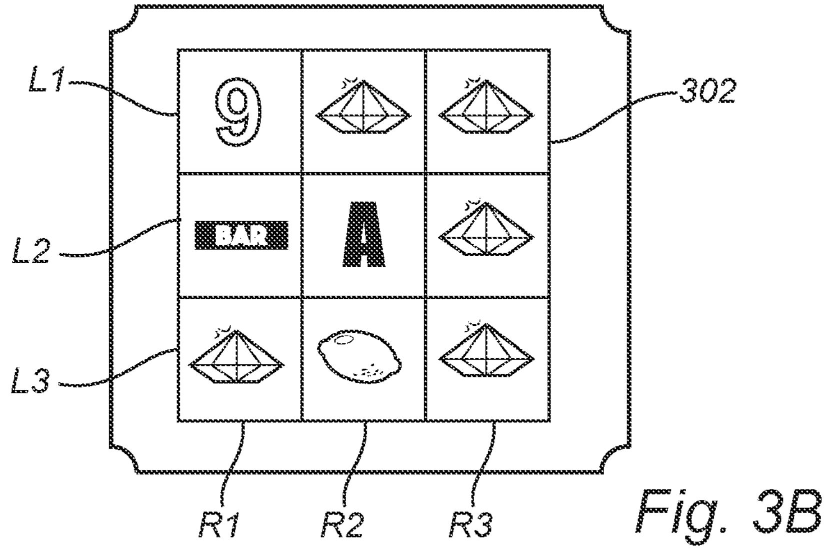
Figure 3C:
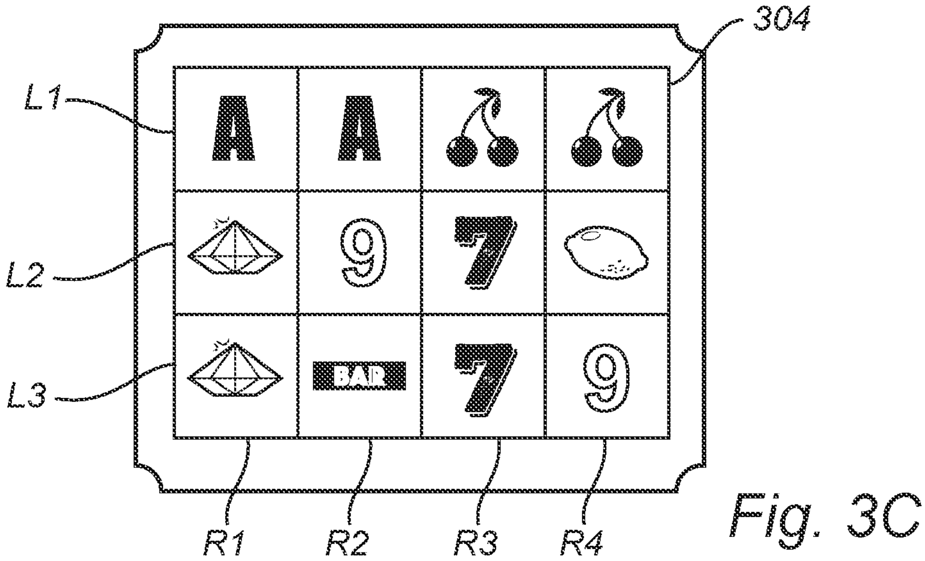
Figure 4:
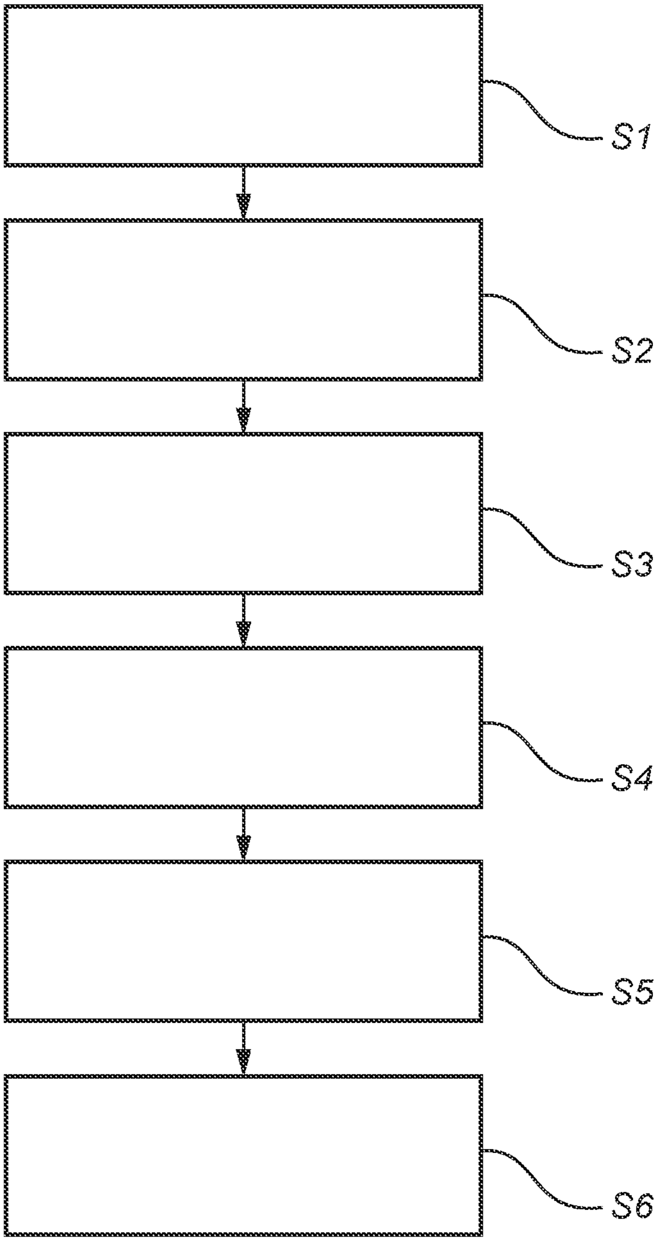
FIG. 4 is a flow chart illustrating the exemplary steps for operating the gaming system as shown in FIG. 1.

Turning now to FIGS. 3A-3C in conjunction with FIG. 4, illustrating different tables according to different embodiments of the present disclosure. Specifically, FIG. 3A illustrates a table comprising three reels (R1-R3) and two lines (L1-L2), FIG. 3B illustrates a table comprising three reels (R1-R3) and three lines (L1-L3), whereas FIG. 3C illustrates a table comprising four reels (R1-R4) and three lines (L1-L3). Generally, the tables illustrated in FIGS. 2 and 3A-3C are related to one or more levels as used in relation to the present disclosure. Accordingly, one specifically sized table may possibly be used for more than a single level. It should however be understood that the present disclosure is likewise applicable to other sized tables, such as a table comprising three reels and only a single line.

As mentioned, in FIG. 3A there is shown a table 300 comprising three reels (R1-R3) and two lines (L1-L2). The table 300 is here provided for use in relation to at least one of the plurality of different levels of the game. In accordance to the present disclosure, the process according to the present disclosure starts by the server 102 receiving, S1, a request from the electronic user device 106 to play a game provided by the server 102. In the illustration presented in FIG. 3A, the game provided by the server 102 is a virtual slot game.

Following the request, the server 102 forms the table 300 in the form of a grid having a selected dimension (three reels and two lines) and comprising a selected number of cells (in FIG. 3A a total of six cells). The structure of the table 300 may be displayable at a display screen of any of the client devices 106, 108, 110.

The server 102 subsequently generates, S3, a set of elements corresponding to the number of cells of the table, wherein the set of elements are selected from a group of predefined element types, and the selection of the set of elements is dependent on a present level of the plurality of different levels. Accordingly, the type of elements presented within the table will be dependent on the present level of the game. The cells of the table 300 are then populated, S4, with the generated set of elements. The server 102 has then directed, S5, e.g. client device 106 to display the populated table 300. In case the game is a game of chance, the elements may be at least semi-randomly generated and similarly the positioning of the elements within the table 300 may be semi-randomly selected. The server 102 additionally provides, S6, a set of game visuals to the electronic user device to enable a player to interact with the game. Such game visuals may for example include the button 206 as presented in relation to FIG. 2.

When the element populated table 300 is in place, the server performs an automated process of analyzing a player interaction received, S7, from the client device 106 as a response to the set of game visuals (e.g. including the button 206 as well as other possible game visuals).

The server 102 is further adapted to automatically determine, S8, a gaming outcome by applying a matching scheme adapted to match a cluster of adjacently arranged cells within the table with one of a plurality of predefined cluster formations stored at the server, wherein the matching scheme applied for determining the gaming outcome is dependent on the present level. In FIG. 3A, the top line L1 presents three "sevens", which by the server is identified as a matching cluster. In FIG. 3A, the three sevens are marked as slightly grayed out.

The determined gaming outcome thus indicates a "win". The matching scheme is here arranged to determine the gaming outcome using a computational efficient matching scheme implementation quickly and precisely. As discussed above, the server 102 may for example implement image processing related schemes for achieving the desired effect of being computational efficient.

The server will then subsequently determine of to select, S9, another of the plurality of different levels. This determination is performed by the server 102 based on the gaming outcome and the received player interaction. Accordingly, the server 102 will take into account how the player interacted with the game as well as how well the game itself progresses (i.e. by means of the gaming outcome). As such, the game will not automatically progress to the next level until the player has fulfilled some predefined game metrics that are determined by the server 102 and compared to corresponding definitions, for example stored by the database 104. As has been discussed above, since the game will not automatically progress to the next level, it will be possible for the operator of the server 102 to implement means to ensure that the player is "feeling" safe and secure at one level before being allowed to progress to the next level.

FIGS. 3B and 3C are two further examples of different structures of the table, here 302 and 304, that are to be used in relation to some of the other levels as provided by means of the present disclosure. The table 302 in FIG. 3B is as indicated above shown to comprise three reels (R1-R3) and three lines (L1-L3). Similarly, to the example presented in relation to FIG. 3A, a positive gaming outcome is here showed as a grayed-out section in FIG. 3B comprising three "diamonds".

FIG. 3C presents still a further example of a table, here comprising four reels (R1-R4) and three lines (L1-L3). Unfortunately, no positive gaming outcome results from the elements in FIG. 3C, since no cluster of adjacently arranged elements of e.g. the same type can be found in FIG. 3C.

As described above, the game includes different levels which include different tables of different structures, different matching schemes or cluster formations, different predetermined elements, the introduction or removal of different game features and different game objectives. An example of the scheme is included in the table below:

| Level | 1 | 2 | 3 | 4 | 5 | 6 | 7 | 8 | 9 |
|---|---|---|---|---|---|---|---|---|---|
| Table structure | 3 × 1 | 3 × 1 | 3 × 2 | 3 × 2 | 3 × 3 | 3 × 3 | 4 × 3 | 4 × 3 | 5 × 3 |
| Matchign scheme | 1 | 1 | 2 | 2 | 5 | 5 | 10 | 10 | 10 |
| Predetermined Elements | 1 High paying symbol (HP), and 1 low paying symbol (LP) | 1 HP 2 LP, WILD | 2 HP,, 2 LP,, WILD | 2 HP, 3 LP, WILD | 3 HP, 3 LP, WILD, bonus scatter | 3 HP, 4 LP, WILD, free spin scatter | 4 HP, 4 LP, WILD, bonus scatter | 4 HP, 5 LP, WILD, free spin scatter | 5 HP, 5 LP,, WILD, bonus scatter |
| Features added | 0 | 0 | 2 wilds trigger a single re-spin while they remain sticky. | Re-spin can be retriggered with a new wild landing, which also | A single bonus scatter can land on reel 2 and award a | A single free spin scatter can land on reel 2 and | 2 bonus scatters can land, one on reel 2 and another on reel 3, and | 2 free spin scatters can land, one on reel 2 and another | 3 bonus scatters can land, one on reel 2, another on reel 3, and the last |

-continued

| | | | | | | | | | |
|---|---|---|---|---|---|---|---|---|---|
| | | | | becomes sticky | 20× the bet payout | award 5 free spins where all the wilds landing become sticky. | they award a 20× or 60× the bet payout. | on reel 3, and they award 5 free spins where all the wilds landing become sticky. Free spin scatters land during free spins and each of them adds plus 1 spin to the total. | one reel 4, and they award a 20×, 60× or 100× the bet payout. |
| Features removed | | | | | | Bonus cannot be triggered as the bonus scatter is removed. | Free spins cannot be triggered as the free spin scatter is removed. | Bonus cannot be triggered as the bonus scatters are removed. | Free spins cannot be triggered as the free spin scatters are removed. |
| Feature upgraded | | | | | | | Re-spin triggers with 3 symbols instead of the previous 2. | | Re-spin triggers with 4 symbols instead of the previous 3. |
| Game Objectives | 3 wins | 3 wins with wild | Trigger re-spin twice to complete | Retrigger re-spin to complete | Trigger bonus to complete. | Trigger free spins to complete. | Trigger bonus to complete | Trigger free spins to complete. | Trigger bonus to complete |

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

What is claimed is:

1. A computer implemented method performed by a gaming system, the gaming system comprising a server arranged in communication with an electronic user device using a network connection, the electronic user device comprising a display screen, wherein the method comprises the steps of:

receiving, at the server, a request from the electronic user device to play a game provided by the server, the game including a plurality of different levels, forming, at the server, a table in the form of a grid having a selected dimension and comprising a selected number of cells, generating, at the server, a set of elements corresponding to the selected number of cells, wherein the set of elements are selected from a group of predefined element types, and the selection of the set of elements is dependent on a present level of the plurality of different levels, populating, at the server, the cells of the table with the set of elements, directing, using the server, the electronic user device to display the table at the display screen, providing, using the server, a set of game visuals to the electronic user device to enable a player to interact with the game, receiving, at the server, a player interaction from the electronic user device as a response to the set of game visuals, determining, at the server, a gaming outcome by applying a matching scheme adapted to match a cluster of adjacently arranged cells within the table with one of a plurality of predefined cluster formations stored at the server, wherein the matching scheme applied for determining the gaming outcome is dependent on the present level, and selecting, at the server, another level of the of the plurality of different levels based on the gaming outcome and the received player interaction.

2. The method according to claim 1, wherein each level includes a set combination of gaming features, the set combination of gaming features differing for each level.

3. The method according to claim 1, wherein selecting another level is further based on a progression goal being attained.

4. The method according to claim 1, wherein the gaming features includes a combination of changing of dimensions of the table and selected number of cells, element types, chances of a successful game outcome, winning combinations, gaming features and the progression goal.

5. The method according to claim 1, wherein the steps of the method are continuously performed in response to player interaction received at the server and from the electronic user device.

6. The method according to claim 1, wherein the combination of game features in different levels includes at least one of an increase in the group of predefined element types and an increase in the selected dimension of the table and the selected number of cells.

7. The method according to claim 1, wherein the game provided by the server is a virtual slot game.

8. The method according to claim 1, wherein the electronic user device is adapted to present a graphical user interface (GUI) at the display screen, and the method further comprises the steps of:

forming, at the server, a graphical representation of the gaming outcome, and directing, using the server, the electronic user device to display the graphical representation.

9. A gaming system comprising a server arranged in communication with an electronic user device using a network connection, the electronic user device comprising a display screen, wherein the server is adapted to:

receive a request from the electronic user device to play a game provided by the server, the game including a plurality of different levels, forming, at the server, a table in the form of a grid having a selected dimension and comprising a selected number of cells, generate a set of elements corresponding to the selected number of cells, wherein the set of elements are selected from a group of predefined element types, and the selection of the set of elements is dependent on a present level of the plurality of different levels, populate the cells of the table with the set of elements, direct the electronic user device to display the table at the display screen, provide a set of game visuals to the electronic user device to enable a player to interact with the game, receive a player interaction from the electronic user device as a response to the set of game visuals, determine a gaming outcome by applying a matching scheme adapted to match a cluster of adjacently arranged cells within the table with one of a plurality of predefined cluster formations stored at the server, wherein the matching scheme applied for determining the gaming outcome is dependent on the present level, and select another level of the of the plurality of different levels based on the gaming outcome and the received player interaction.

10. The gaming system according to claim 9, wherein each level includes a set combination of gaming features, the set combination of gaming features differing for each level.

11. The gaming system according to claim 9, wherein selecting another level is further based on a progression goal being attained.

12. The gaming system according to claim 9, wherein the gaming features includes a combination of changing of dimensions of the table and selected number of cells, element types, chances of a successful game outcome, winning combinations, gaming features and the progression goal.

13. The gaming system according to claim 9, wherein the steps of the method are continuously performed in response to player interaction received at the server and from the electronic user device.

14. The gaming system according to claim 9, wherein the combination of game features in different levels includes at least one of an increase in the group of predefined element types and an increase in the selected dimension of the table and the selected number of cells.

15. The gaming system according to claim 9, wherein the matching scheme applied for determining the gaming outcome is dependent on the present level.

16. The gaming system according to claim 9, wherein the electronic user device is adapted to present a graphical user interface (GUI) at the display screen, and the server is further adapted to:

form a graphical representation of the gaming outcome, and direct the electronic user device to display the graphical representation.

17. A computer program product comprising a non-transitory computer readable medium having stored thereon computer program means for operating a gaming system, the gaming system comprising a server arranged in communication with an electronic user device using a network connection, the electronic user device comprising a display screen, wherein the computer program product comprises:

code for receiving, at the server, a request from the electronic user device to play a game provided by the server, the game including a plurality of different levels, code for forming, at the server, a table in the form of a grid having a selected dimension and comprising a selected number of cells, code for generating, at the server, a set of elements corresponding to the selected number of cells, wherein the set of elements are selected from a group of predefined element types, and the selection of the set of elements is dependent on a present level of the plurality of different levels, code for populating, at the server, the cells of the table with the set of elements, code for directing, using the server, the electronic user device to display the table at the display screen, code for providing, using the server, a set of game visuals to the electronic user device to enable a player to interact with the game, code for receiving, at the server, a player interaction from the electronic user device as a response to the set of game visuals, code for determining, at the server, a gaming outcome by applying a matching scheme adapted to match a cluster of adjacently arranged cells within the table with one of a plurality of predefined cluster formations stored at the server, wherein the matching scheme applied for determining the gaming outcome is dependent on the present level, and code for selecting, at the server, another level of the of the plurality of different levels based on the gaming outcome and the received player interaction.

* * * * *